June 6, 1967     C. E. BAKER     3,323,778
ELEVATING MECHANISM
Filed April 1, 1966     2 Sheets-Sheet 1
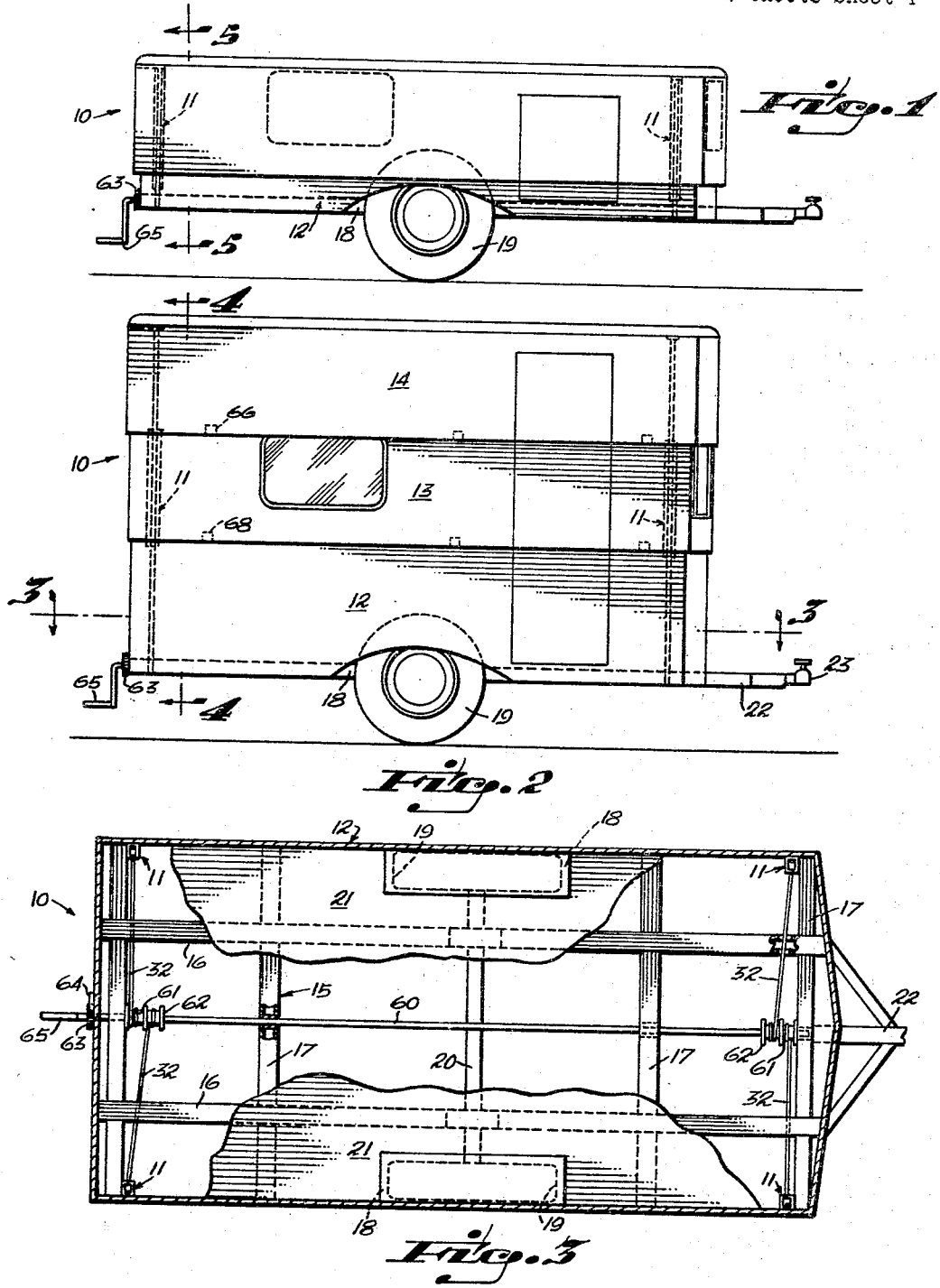
INVENTOR.
CLARENCE E. BAKER
BY E. H. Schmidt
ATTORNEY.

June 6, 1967  C. E. BAKER  3,323,778
ELEVATING MECHANISM
Filed April 1, 1966  2 Sheets-Sheet 2
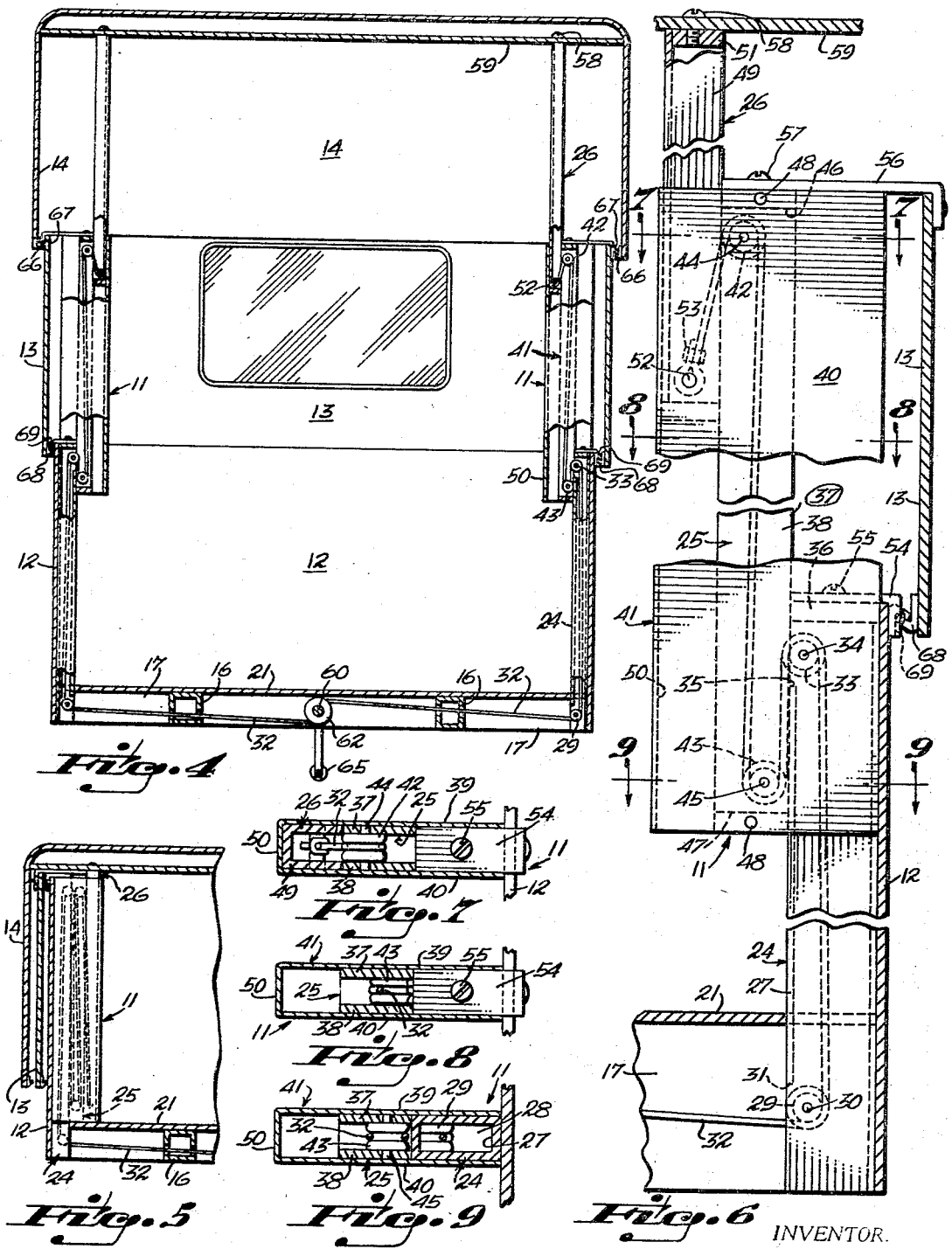
INVENTOR.
CLARENCE E. BAKER
BY E. H. Schmidt
ATTORNEY.

United States Patent Office 3,323,778
Patented June 6, 1967

3,323,778
ELEVATING MECHANISM
Clarence E. Baker, 13450 NE. 6th Ave.,
North Miami, Fla. 33161
Filed Aug. 1, 1966, Ser. No. 569,164
8 Claims. (Cl. 254—148)

This invention relates to extensible elevating mechanisms and is directed particularly to improvements in such mechanisms as are particularly well suited for use in raising three or more telescopingly interfitting sections of collapsible trailers and the like.

The principal object of the invention is to provide an improved elevating mechanism comprised of three or more elongated, relatively extensible sections and including cable means for relatively extending the sections in consecutive order with sufficient force to elevate substantial weight in the form of vertically extensible trailer sections or the like.

Another object is to provide an elevating mechanism of the character described that lends itself readily and simply to mechanical coupling with one or more additional elevating mechanisms for their operation in unison by a single actuating means.

Yet another object is to provide an elevating mechanism of the above nature wherein the individual sections can, for the most part, be manufactured of stock plate or sheet metal and/or simple metal extrusions, and stock hardware items, for simplicity of manufacture and economy.

Still other objects of the invention are to provide an elevating mechanism of the character above described which will be compact, fool-proof in operation, and durable in use.

Other objects features and advantages of the invention will be apparent from the following description when read with reference to the accompany drawings.

In the drawings, wherein like reference numerals denote corresponding parts throughout the several views:

FIG. 1 illustrates a vertically-collapsible camping trailer having elevating mechanism embodying the invention, the trailer being shown in the fully collapsed condition;

FIG. 2 is a view similar to FIG. 1, but showing the trailer in vertically-extended condition;

FIG. 3 is a cross-sectional view of the trailer, taken along the line 3—3 of FIG. 2 in the direction of the arrows, and with portions broken away to illustrate the actuating means for the elevating mechanism;

FIG. 4 is a transverse cross-sectional view taken along the line 4—4 of FIG. 2 and illustrating details of the elevating mechanism;

FIG. 5 is a partial vertical cross-sectional view taken along the line 5—5 of FIG. 1 showing the trailer and the associated elevating mechanism in fully collapsed condition;

FIG. 6 is an enlarged view of the elevating mechanism illustrated at the right-hand side in FIG. 4, shown separately, with portions broken away;

FIG. 7 is a horizontal cross-sectional view taken along the line 7—7 of FIG. 6 in the direction of the arrows and illustrating constructional details of the elevating mechanism;

FIG. 8 is a horizontal cross-sectional view taken along the line 8—8 of FIG. 6 in the direction of the arrows; and FIG. 9 is a horizontal cross-sectional view taken along the line 9—9 of FIG. 6 in the direction of the arrows.

Referring now in detail to the drawings, 10 in FIGS. 1, 2 and 3 designates a collapsible trailer equipped with a plurality of elevating mechanism units 11 (FIGS. 3 through 9) embodying the invention. The trailer 10 comprises, generally, a lower section 12, an intermediate section 13 and an upper section 14, the upper and intermediate sections of which collapse telescopingly over the lower section, as illustrated in FIG. 1, under the control of the elevating mechanism embodying the invention hereinafter described. The lower trailer section 12 is supported by a rectangular framework 15 of longitudinal channel members 16 secured in spaced relation, such as by welding, by a plurality of transverse channel members 17 spaced from end to end along said longitudinal channel members. Wells 18 are formed within the underside of the lower section 12 at each side thereof and approximately centrally therealong to receive wheels 19 journalled at each end of an axle 20 secured against the underside of the framework 15. A floor panel 21 is secured against the upper surfaces of the framework 15, and the front end of said framework is provided with a forwardly-projecting portion 22 terminating in the usual trailer hitch 23.

Referring to FIGS. 1, 2 and 3, it will be seen that four elevating mechanism units 11 are shown, by way of example of use, as the extending and collapsing means for the telescoping trailer sections, there being one at each inside corner of the trailer. Since the elevating mechanism units are identical, only one, the rear, right-hand unit as seen from the inside of the trailer, will be described in detail as being illustrative of a preferred embodiment of the invention.

With reference now to FIGS. 6 through 9, the elevating mechanism unit is comprised of three elongated sections; a lower section 24, an intermediate section 25 and an upper section 26, said sections being arranged in parallel, edge-to-edge abutting relation and axially movable with respect to one another as hereinbelow described. As illustrated in FIG. 5, the sections 24, 25, 26 are preferably coextensive and in transverse register with one another when the unit is in collapsed condition.

Lower section 24 of the elevating mechanism unit 11 is in the form of a tube 27 of rectangular cross-section providing a central rectangular opening or chamber 28. As best illustrated in FIG. 6, there is provided near the lower end of and within the chamber 28, a pulley wheel or sheave 29 journalled on a transverse pin 30. An inner end portion of the lower end of the tube 27 is cut away, as indicated at 31, to provide an opening for outward passage of an actuating cable 32, as is hereinbelow more particularly described. The opposite or upper end of the rectangular tube 27 is similarly fitted with a sheave 33 journalled on a transverse pin 34, and provided with an opening 35 for outward passage of the cable 32 at the upper end of said tube. The upper end of the tube 27 is sealed off with an end plate 36 secured flush therein as by welding or the like.

The intermediate section 25 of the elevating mechanism unit 11 comprises a pair of parallel, coextensive, elongated side plate members 37, 38 secured in spaced relation against and along opposed, inner wall portions 39, 40 of a coextensive housing member 41 which is U-shaped in cross-section. The plate members 37, 38 are centrally arranged along the housing member wall portions 39, 40 and said wall portions are so spaced as to slidingly embrace the opposed outer side walls of the lower section 24, thereby holding said lower section and the intermediate section 25 in interfitting relation. Sheaves 42, 43 are journalled between the plate members 37, 38 near the upper and lower ends thereof, respectively, being rotatably supported on transverse pins 44, 45. End plates 46, 47 are fitted in spaced relation between the upper and lower ends, respectively, of the plate members 37, 38, being secured in place as by transverse pins 48. The pins 48 extend through the housing wall portions 39, 40 of the housing member 41 and are secured thereto.

The upper section 26 comprises an elongated member 49, channel or U-shaped in cross section and of such size as to fit slidingly within the U-shaped housing member 41 between the inner edges of the side plates 37, 38 and the inner wall of the web portion 50 of said housing member. The upper end of the elongated member 49 is fitted with an end plate 51, and a transverse pin 52 within the lower end of said elongated member anchors one end of the actuating cable 32 as by means of a clamp bolt 53. The cable 32 extends over the upper sheave 42 and under the sheave 43, thence up over the sheave 33 and down under the sheave 29, thence out through the opening 31 to actuating mechanism as is hereinafter described.

In the exemplified use of four of the elevating mechanism units in the above-described three section, vertically-expansible trailer, the rectangular tubes of the lower section 24 are secured, as by welding, in the corners of the rectangular trailer framework 15 with their lower ends projecting through the floor panel 21 thereof and with openings 31 directed inwardly. A clamp plate 54 held by a machine screw 55 may be used to secure the upper ends of the lower sections 24 against the upper edge of the lower trailer section 12. Similarly, a clamp plate 56 held by a machine screw 57 may be used to secure the upper end of the intermediate section 25 in spaced parallel relation with respect to the upper edge of the intermediate trailer section 13. The upper end of upper section 26 may conveniently be secured with respect to the trailer upper section 14 as by a machine screw 58 extending through the ceiling panel 59 of said trailer upper section into the upper end plate 51 of said upper section.

As an example of actuating mechanism for controlling for simultaneous action of a plurality of elevating mechanism units 11, the underside of the trailer framework 15 is provided with a centrally disposed, longitudinally-extending control rod 60 journalled within openings in the framework transverse members 17 (see FIG. 3). The outer ends of laterally-opposed pairs of the actuating cables 32 are affixed to spool pairs 61, 62 secured upon control rod 60 near front and rear ends thereof, respectively. The rear end of the control rod 60 extends outwardly of the framework 15 and carries a ratchet wheel 63 cooperative with a pawl 64 (FIG. 3). A crank handle 65 removably affixed to the outwardly-extending end of the control rod 60 enables manual turning of the rod 60 for simultaneously winding the cable pairs 32, 32 on their associated spools 61, 62. It will be apparent that as the cables are thus reeled in, the upper sections 26 of the elevating mechanisms 11 will first be extended to move the trailer upper section 14 to its limit position, which limit position is reached, for example, when the clips 66 spaced along the lower edge at the inside of said upper section hookingly engage clips 67 correspondingly spaced along the upper edge at the outside of the trailer intermediate section 13. Further shortening of the actuating cables 32 will serve to push the upper and intermediate trailer sections 14 and 13 upwardly in unison until said intermediate section reaches its limit position which, in the illustrated example, occurs when clips 68 spaced along the lower edge at the inside of said intermediate section hookingly engage clips 69 correspondingly spaced along the upper edge at the outside of the trailer lower section 12. At this time the elevating mechanism units 11 will be in fully extended condition and the trailer 10 will be in corresponding extended position as illustrated in FIGS. 2 and 4. When the above-described actuating mechanism is in such fully extended position, the gravity-controlled pawl 64 will be hooked into the ratchet wheel 63 to prevent backward turning of the control rod 60 and consequent collapsing of the elevating mechanism units 11. Release for manual collapsing of the trailer when desired can be effected simply by lifting the pawl 64 away from the ratchet wheel to permit unwinding of the actuating cables 32.

While there is illustrated and described herein only one form in which the invention can conveniently be embodied in practice, it is to be understood that this form is given by way of example only and not in a limiting sense. The invention, in brief, comprises all the embodiments and modifications coming within the scope and spirit of the following claims.

What I claim as new and desire to secure by Letters Patent is:

1. In an elevating mechanism, the combination comprising elongated lower, intermediate and upper sections, said sections each being rectangular in cross-sectional contour and having longitudinally-extending interior openings, housing means constraining said sections in edge-to-edge relative disposition and longitudinal sliding movement with respect to one another, a first pair of upper and lower pulley sheaves journalled at each end within said lower section, a second pair of upper and lower pulley sheaves journalled at each end within said intermediate section, and a flexible cable fixed at one end near the lower end of said upper section and extending over and under said pair of upper and lower pulley sheaves, respectively, of said intermediate section, and thence extending over and under said pair of upper and lower pulley sheaves, respectively, of said lower section, said housing means comprises an elongated housing member U-shaped in cross section and substantially coextensive with said intermediate section, said intermediate section being in longitudinally extending disposition within and between the opposite side wall portions thereof and affixed thereto.

2. An elevating mechanism as defined in claim 1 wherein said upper section is slidingly received within said housing member between the web portion thereof and longitudinal edge portions of said intermediate section.

3. An elevating mechanism as defined in claim 1 wherein said intermediate section comprises a pair of spaced, parallel side plates.

4. An elevating mechanism as defined in claim 3 wherein said upper section is U-shaped in cross-section and wherein the vertical edges of the open end portions of said upper section are in edge-to-edge relatively sliding engagement with respect to the inner edges, respectively, of said side plates of said intermediate section.

5. An elevating mechanism as defined in claim 1 wherein said lower section is in the form of a rectangular tube in cross-sectional shape, upper and lower end wall portions of said lower section being broken away to provide openings for passage of said cable into and out of the interior of said lower section.

6. An elevating mechanism as defined in claim 1 wherein said upper, lower and intermediate sections are of substantially equal length.

7. An elevating mechanism as defined in claim 3 wherein said lower section is in the form of a rectangular tube in cross-sectional shape, upper and lower end wall portions of said lower section being broken away to provide openings for passage of said cable into and out of the interior of said lower section.

8. An elevating mechanism as defined in claim 7 wherein said upper, lower and intermediate sections are of substantially equal length.

References Cited

UNITED STATES PATENTS

| | | | |
|---|---|---|---|
| 2,292,107 | 8/1942 | Doepke | 296—23.3 |
| 2,739,833 | 3/1956 | Schenkel | 296—27 |

EVON C. BLUNK, *Primary Examiner.*

H. C. HORNSBY, *Assistant Examiner.*